United States Patent [19]

Day

[11] Patent Number: 5,142,472
[45] Date of Patent: Aug. 25, 1992

[54] METHOD OF MEASURING THE RESISTIVITY AND THICKNESS OF A THIN UNDERGROUND LAYER USING INDUCTION LOGGING

[75] Inventor: Peter I. Day, Yorba Linda, Calif.

[73] Assignee: Union Oil Company of California, Los Angeles, Calif.

[21] Appl. No.: 401,006

[22] Filed: Aug. 31, 1989

[51] Int. Cl.$^5$ .............................................. E21B 29/00
[52] U.S. Cl. .................................... 364/422; 324/345
[58] Field of Search ................... 364/422; 73/152-153; 324/345, 351-352, 354, 355, 357, 373

[56] References Cited

PUBLICATIONS

"Well Logging for Earth Scientists", by Darwin V. Ellis, Chapter 6, Induction Devices, pp. 99-121, Elsevier Science Publishing, 1987.
"Theory of Induction Sonde in Dipping Beds", R. H. Hardman and L. C. Shen, Chapter 6, pp. 6.1-6.52, Well Logging Technical Report No. 5, Oct. 25, 1984, University of Houston.
Schlumberger Log Interpretation Charts, 1989, Induction Charts, pp. 82-94.

*Primary Examiner*—Gail O. Hayes
*Attorney, Agent, or Firm*—Gregory F. Wirzbicki; William O. Jacobson

[57] ABSTRACT

A method used for determining true in-situ resistivity of a thin layer within a formation from dual induction log data. The method calculates true resistivity without the existing need: 1) for an accurate estimate of the layer thickness, or 2) to extrapolate correction factors for thin layers. The method first corrects resistivity data read from the dual induction log. A representative shoulder bed resistivity is first determined from average deep resistivity data near the shoulder bed. A paired estimate of layer resistivity and thickness is then computed based upon the determined shoulder bed resistivity, dip angle, and both deep and medium resistivity data related to the thin bed. The method does not require thickness data to be input, and in fact outputs this infomation, if needed.

17 Claims, 3 Drawing Sheets

METHOD OF MEASURING THE RESISTIVITY AND THICKNESS OF A THIN UNDERGROUND LAYER USING INDUCTION LOGGING

FIELD OF THE INVENTION

This invention relates to the analysis of well logs. More specifically, the invention concerns a method to determine the resistivity of a thin layer within an underground formation using data from a dual induction instrument.

BACKGROUND OF THE INVENTION

Many natural resource industry activities involve logging a well bore which penetrates an underground formation in a zone of commercial interest. The objective of the logging is to determine the in-situ properties and commercial value of one or more underground layers of special interest in this zone. These layers are typically sandwiched between thicker shoulder beds immediately over- and under-lying the layer of interest (i.e., the thick surrounding beds are not of commercial interest).

Thinner layers (i.e., generally less than 3 meters thick) are increasingly of commercial interest. For certain resources of increasing scarcity, such as oil and gas, the production potential from thin layers is now commercially viable. Accurate knowledge of the layer's resistivity may be critical to assessing the thin layer's commercial value.

Existing thin layer resistivity logging instruments are generally wire line supported. The wire line supplies electrical power and transmits signals from the instrument traversing the zone. The instrument contains either (1) electrical potential/current sources and electrical monitoring contact points (i.e., electrode devices), or (2) magnetic or other electromagnetic field sources and receivers (i.e., induction devices). Electrode devices can only be used where direct electrical contact to the formation materials can be maintained, e.g., using conductive drilling muds or metal liners. Induction devices, devices however, can be used in many non conductive as well as conductive well bore environments.

Some wire line induction instruments have two or more electromagnetic receivers located at different distances from a source. Instruments may also include focusing coils to shape the field generated by one or more sources. The multiple receivers produce several sets of data (or log charts) as the device moves, traversing the well bore in the zone of interest, e.g., a Dual Induction log. The dual log instruments are configured to obtain information from different radial depths (e.g., Deep and Medium depth logs) into the formation from the well bore. Still other logging devices or receivers may be used to read "near-depth" or "flushed" resistivity data, e.g., near-well bore alteration or mud cake data.

Existing induction instruments experience at least three perturbing influences. These are: (1) a conductive (or otherwise electromagnetic field interactive) influence from a fluids present in the well bore; (2) shoulder bed(s) within the extended responses of the induction device while it traverses near the thin bed; and (3) fluid alteration of the formation immediately surrounding the well bore.

The primary objectives of a layer resistivity logging method are to: (1) accurately estimate the layer's true (representative of in-situ) electromagnetic resistive properties; (2) tolerate various well directions, layer non-linearities, fluid property variations, near well bore fluid invasion and well bore alterations; and (3) permit logging of thin as well as thick layers at various (dip) angles to the well bore. The method should also be reliable, require little or no independent sources of input data and be simple to use.

Existing well bore resistivity analysis methods may do some of these objectives well. However, other objectives may be accomplished poorly or not at all. Existing dual log analysis methods begin with log data which generally represents resistivity under nominal or ideal conditions. The ideal resistivity estimate assumes a nominal well bore diameter, zero dip angle, non-conductive well bore fluid, infinitely thick layer or bed (i.e., no edge effects), and non-invaded formations. These methods then provide resistivity corrections or factors for actual well bore/instrument geometries, fluid properties, contamination/invasion effects, and layer/edge geometries. Corrections for thin layer geometries require an accurate, sometimes separate and independent source of data to estimate layer thickness.

The current thin layer corrections are essentially based upon extrapolations from ideal (thick) layer conditions and a measurement of actual layer thickness. As less of the (thin) layer and more of the shoulder beds come within the electromagnetic field sensed by the logging resistivity instrument, the accuracy of these extrapolations is limited or even non-existent. Accuracy of correction is especially sensitive to layer thickness data when shoulder bed resistivities are significantly different from the layer resistivity, which is common in oil and gas exploration. Extreme thin layer sensitivity (rapidly changing correction factor versus measured thickness) may require extrapolations of uncertain accuracy for thicknesses as large as approximately 2 meters (6 feet). Even these uncertain extrapolations may end for a measured layer than in the order of 1 meter (3 feet), typically 0.6 to 1.2 meters (2 to 4 feet).

In addition, accurate thin layer thickness measurements and data are especially difficult to obtain in dipping layers (i.e., layers which do not project perpendicularly from the well bore). This combination of factors makes existing resistivity determinations in thin layers dubious at best.

Efforts to improve the determination of resistivity of a dipping thin layer are known. An example of a theoretical approach is found in work done by R. H. Hardman and L. C. Shen, entitled "Theory of Induction Sonde inCed Dipping Beds." Although the analytical approach is theoretically retically accurate (if the assumptions used are correct), a measured value for "apparent" thickness of the layer from the induction log is needed. The "apparent" thickness is derived from the logged distance between the (theoretically) distinct changes of the resistivity (or other logging) data at the shoulder bed interfaces.

However, the distinct changes may not be present in actual logging data (e.g., the layer-shoulder bed transition occurs over a finite distance) or may be obscured by other factors. In addition, the resolution (typically measured in inches) of this type of logged data may be adequate for thick layers (typically measured in tens of feet) but can introduce serious errors in sensitive thin layer calculations.

These layer thickness limitations can be observed in the charts of correction factors developed by Hardman and Shen. These charts show resistivity being very sensitive to "apparent" bed thickness for thin layers, Still further, some of these charts only extend down to thicknesses of approximately 0.6 meter (2 feet). These theoretical and practical aspects make the measurement of "apparent" thickness a poor basis for accurate determination of resistivity of a thin layer of interest.

None of the current "true" thin layer resistivity analysis methods known to the inventor eliminates the problems of (1) requiring very accurate knowledge of "apparent" or actual thin bed thickness or (2) using uncertain or extrapolated correction factor information even if an accurate estimate of layer thickness is known. The invention provides a method to solve these two problems, as well as providing other advantages as will become clear in light of the following description.

SUMMARY OF THE INVENTION

The present invention provides a method which determines resistivity for layers as thin as approximately 0.46 meter (1.5 feet), without requiring an input measurement of layer thickness. Like the existing methods, raw resistivity data near the layer and shoulder beds are read from the dual induction log charts. The raw log chart data are conventionally corrected for perturbations such as well bore/tool geometry. However, the present method diverges from existing methods by determining a paired value of thin bed thickness and "true" resistivity. The determined "true" resistivity can be used to help decide on additional logging to be performed and the commercial potential of the thin layer.

The computations used in the present invention are based upon a theoretical dipping bed model, avoiding some of the extrapolation limitations inherent in the current methods. The method also achieves theoretically accurate results without the need for an independent or accurate source of bed thickness data.

DESCRIPTION OF THE PREFERRED EMBODIMENT

Figure 1:
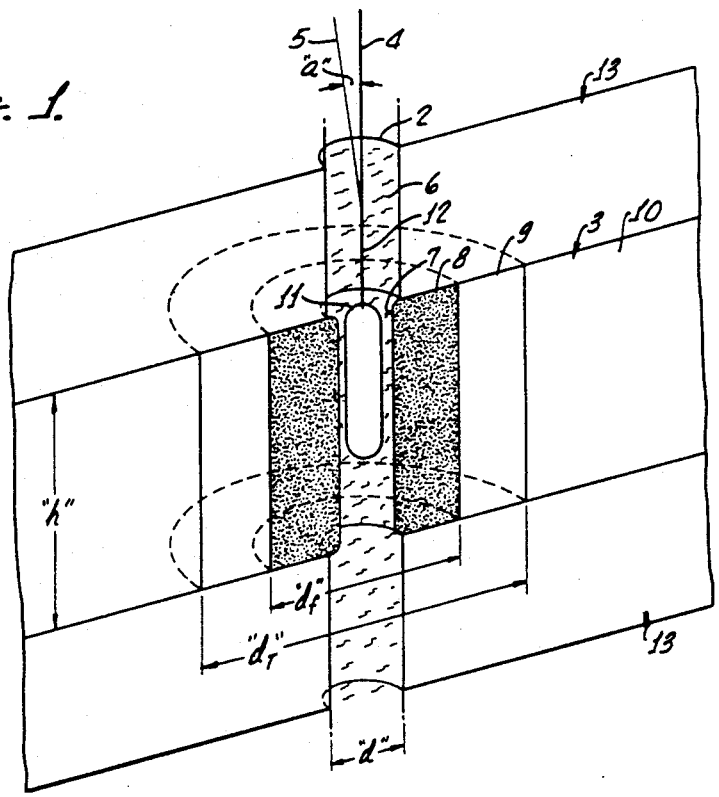
FIG. 1 shows a cross sectional view of a thin layer penetrated by a bore hole.

FIG. 1 shows a cross sectional view of a thin layer penetrated by a cylindrical well bore or hole 2. The resistivity of a thin bed or layer 3 is needed to evaluate the layer's commercial potential. The layer is generally planar having a thickness or height "h" as measured along the vertical axis 4 of the cylindrical well bore 2. The plane of layer 3 is not perpendicular to the cylindrical axis 4. The perpendicular line 5 to the planar layer 3 is orientated at a dip angle "a" with respect to the well bore axis 4.

Although the well bore 4 axis shown in FIG. 1 is vertical, a slanted (non-vertical) well bore 2 intersecting a horizontal layer 3 will also produce a dip angle "a." The height "h" in the slanted well bore configuration would be the distance along the well bore axis, rather than the vertical height shown in FIG. 1.

The well bore cavity is also typically filled with a fluid 6 such as a drilling mud, which may be electrically conducive. The resistivity properties of the thin layer 3 are also disturbed by the penetration of the well bore 2 having diameter "d". The drilling mud 6 may also disturb the thin layer 3. Still further, the drilling mud 6 can leave a mud cake, contamination or residue 7 on the walls of the well bore 2. The circulation of the as drilling mud 6 can leave a flushed zone 8 near the well bore walls 2. The flushed zone can radially penetrate into the formation to form a quasi-cylindrical shape having an approximate outside diameter "$d_f$".

A transition zone or annulus 9 can also be formed by other drilling and related activities. The transition zone can be caused by draining of connate fluids or structural perturbations, rather than direct flushing. The depth of the transition zone can be significant, measured in feet. The transition zone results in an annular ring having an outer diameter "$d_i$". The non invaded zone 10 is largely unaffected by the drilling operations or well bore fluids 6. This non-invaded zone 10 is where resistivity data is sought (i.e., "true" resistivity) as representative of the in-situ properties of the thin layer.

A dual induction logging tool or instrument 11 is placed in the well bore 2, displacing drilling mud 6. The induction tool is supported by a wire line 12 generally extending along well bore axis 4. The wire line transmits electrical power to the electromagnetic field source(s) and senses data signals from the receiver(s). The length (distance along the well bore cylindrical axis 4) of the tool limits the spacing of the electromagnetic source and receivers (not shown for clarity) within the tool 11.

Increased tool length/receiver spacing generally allows a deeper radial penetration of the electromagnetic field into the formation zone beyond the flushed zone 8 or transition zone 9. However, increased spacing also spreads the induced electromagnetic field close to or within a pair of shoulder beds 13 located above or below the thin layer 3. Dual readings of the tool 11 are an attempt to isolate some of these factors, one reading sensing wide and deep (outward along the cylindrical radius) into the formation, the other sensing a narrower zone (minimizing any effect of shoulder beds) but more influenced by nearby zones.

After placing the logging tool 11 into the well bore 2, the electromagnetic field emitting tool 11 traverses along the well bore axis 4. During the traverse or vertical travel, it collects deep and medium depth field resistivity data (e.g., a series of electromagnetic signals on a chart at the surface). The traverse covers a zone of interest which includes portions of the well bore 2 near the thin layer 3, as well as at least a portion near one of the adjoining shoulder beds 13.

Figure 2:
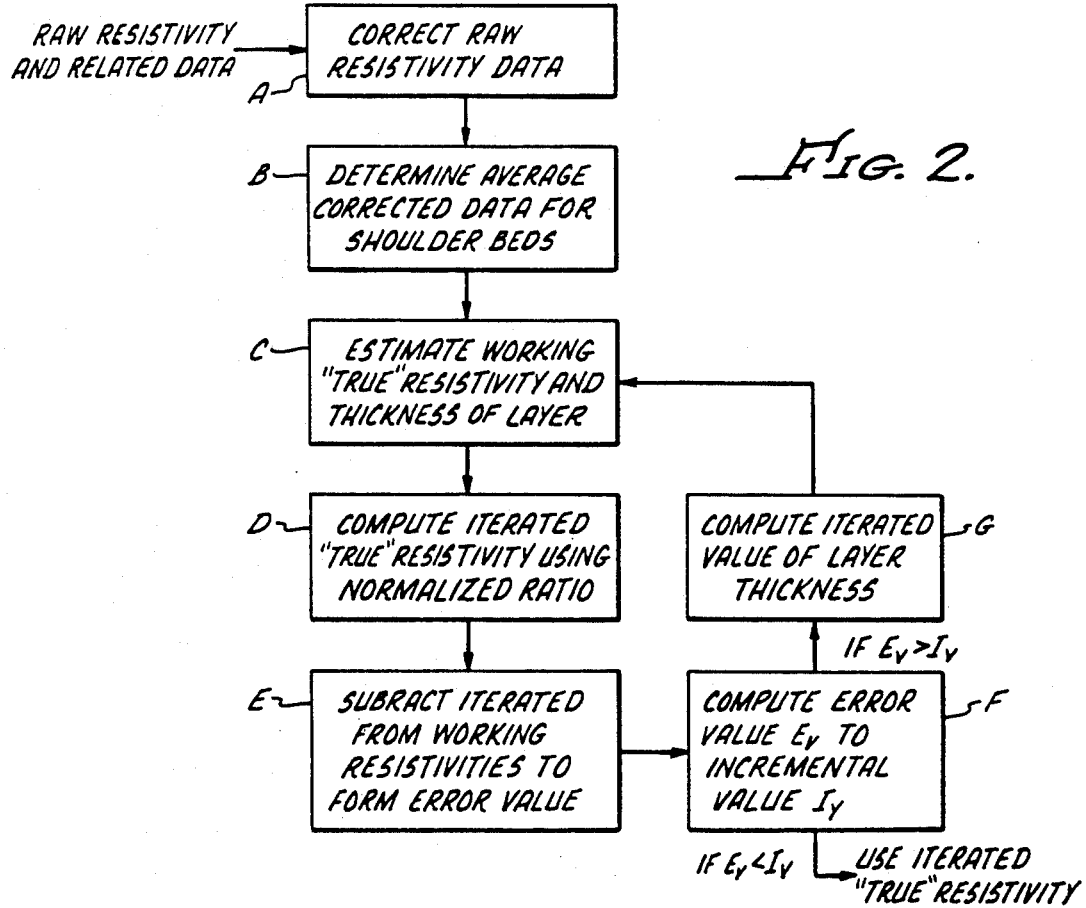
FIG. 2 shows the preferred embodiment process steps of determining resistivity within the thin layer penetrated by the bore hole shown in FIG. 1.

FIG. 2 shows the preferred embodiment process steps of using the dual induction tool data, fluid, well bore geometry, and dip angle to accurately determine the resistivity of non-invaded zone 10 of layer 3. After placing the logging tool in the well and obtaining the raw deep and medium depth resistivity data, first step A corrects the raw data (signals) using existing factors and correction methods. Methods can include a factor for: the invasive and conductivity properties of the drilling mud; the well bore cross-sectional diameter; the geometry of the tool within the well bore (e.g., a specific axial source/receiver spacing, centered within the well bore); skin effect; and data deconvolution. The corrections can be charts of values to be multiplied by the deep and medium resistivity data. In the preferred embodiment, a non conductive and non-invasive drilling fluid is used in a common and symmetric geometry, such that little or no significant change or correction to the raw resistivity data is needed.

The second step B in the process is determining an average shoulder bed resistivity from the corrected data. If data are generally uniform, the corrected deep resistivity data taken when the tool is traversing shoulder beds remote from the thin layer can be used directly for relatively thick shoulder beds. In the preferred embodiment, the average of both corrected shoulder bed resistivities are used, i.e., the average of the data series during the traverse of each bed between the apparent edges (or edge effects) of each bed.

Step C determines a paired value for the thickness of the thin layer and the "true" resistivity. In the preferred embodiment, the means for determining is provided by calculation based upon a paired layer resistivity and thickness relationship to shoulder bed resistivity, maximum corrected deep layer resistivity (i.e., the maximum value of corrected deep resistivity data when the instrument traversed the layer), maximum corrected medium resistivity of the layer, and the layer dip angle.

Figure 3:
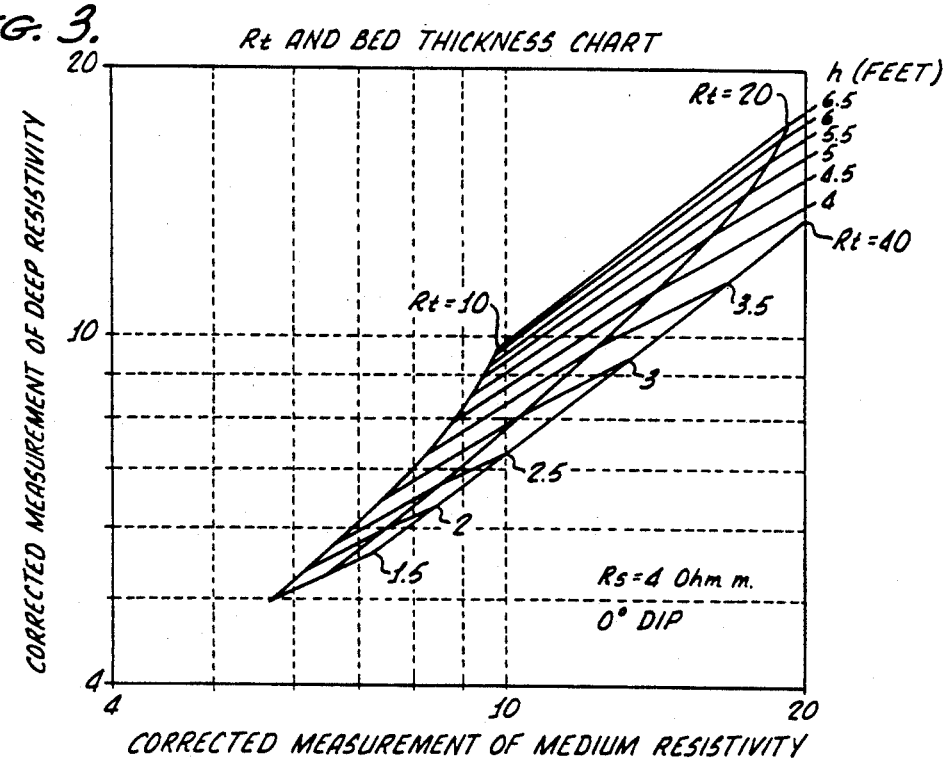
FIG. 3 shows a sample chart used to provide an paired thickness and resistivity values.

This relationship may be put into the form of a series of parameterized charts, e.g., a chart series for dip angles of 0, 15, 30, 45, 60 and 75 degrees, and a second series for shoulder bed resistivities of 1, 2, 4, and 8 ohm-meters. A sample parameterized chart for the paired determination of layer thickness and "true" resistivity is shown in FIG. 3 (see following Example).

In an alternative embodiment, an independent or more accurate estimate of bed thickness is available. This thickness estimate can be provided by a neutron or other type of well logging instrument. The relationship described above can now be used to improve the determination of "true" resistivity. If a more accurate estimate of the layer thickness is available and this estimate is different from the paired determination, a new estimate of thin layer resistivity can be made by using this thickness estimate.

Figure 4:
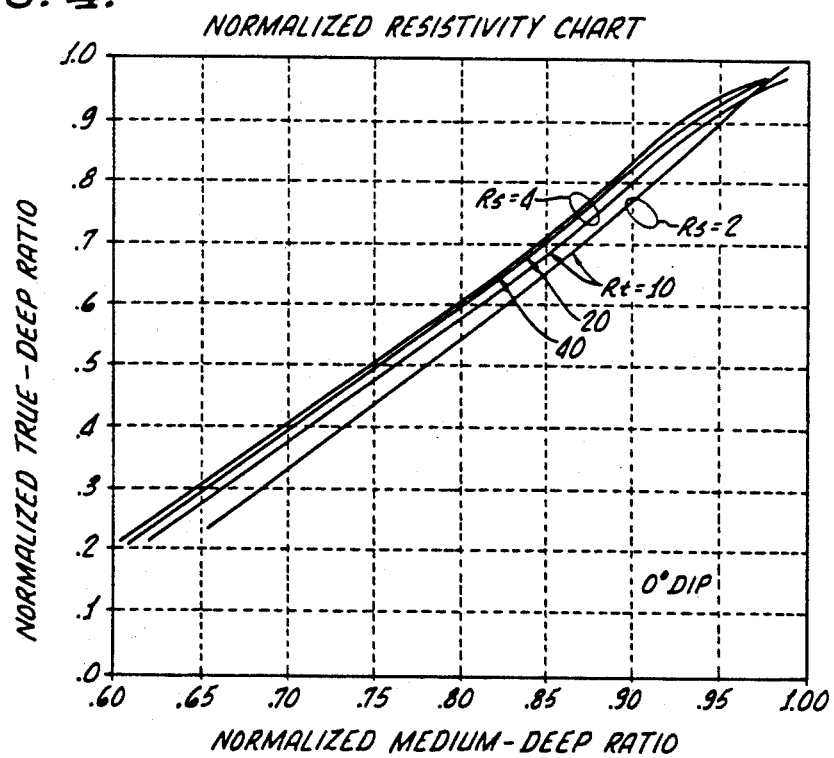
FIG. 4 shows a block diagram of an apparatus embodying the invention.
Figure 5:
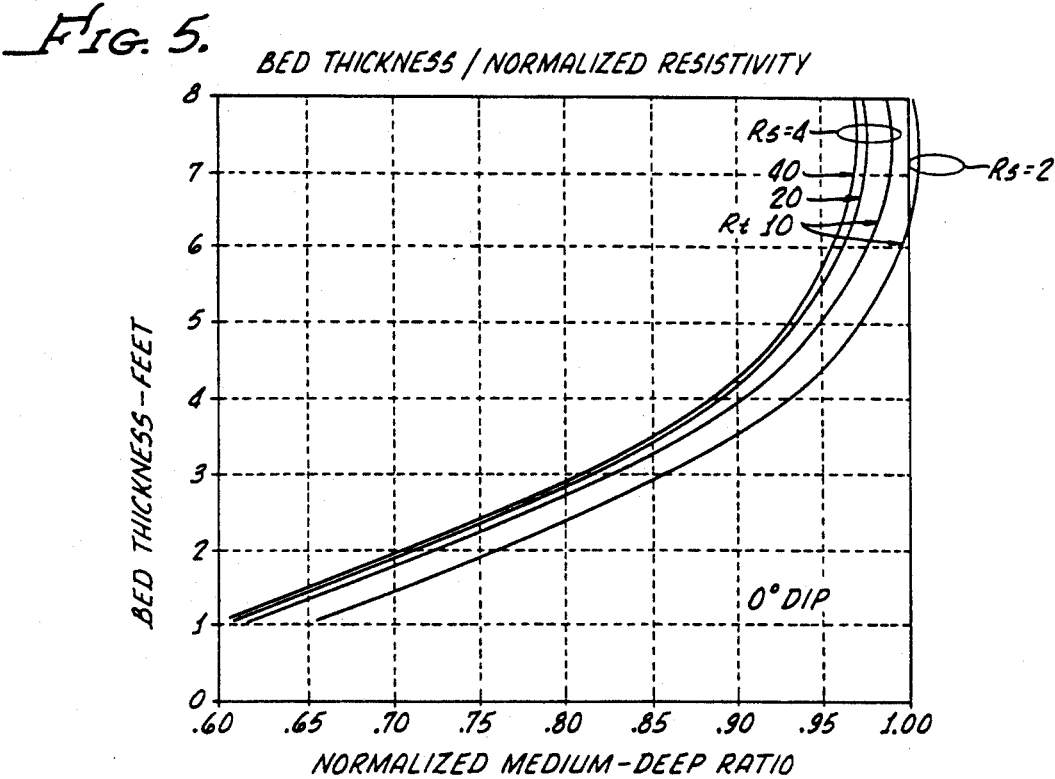
Figure 6:
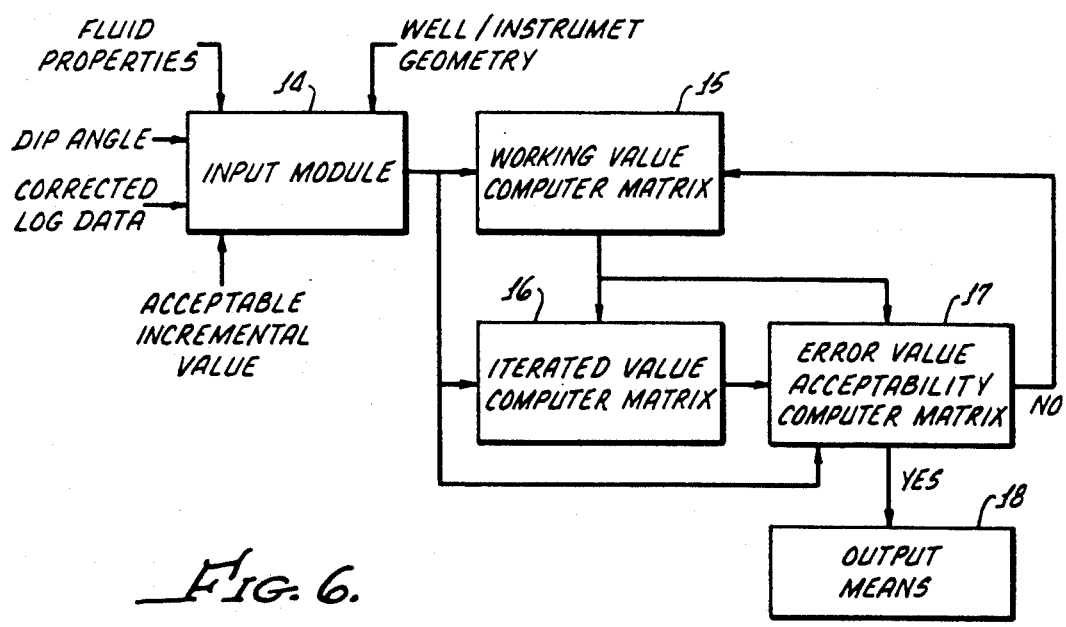

FIG. 4 shows a block diagram of an electrical apparatus which incorporates the invention's method. The input module 14 contains means for digitizing the logging instrument's corrected data series, along with related formation, fluid and geometry information. The input module may be a keyboard for manual entry of the data or a digitizing (in an alternative embodiment) microprocessor. If raw resistivity data are transmitted (in another alternative embodiment), an added correction computing matrix must also be provided after the input module 14. The correction matrix would correct raw resistivity data from input module 14 based upon fluid properties, geometry and other known perturbing factors, excluding layer thickness.

The corrected input data information is transmitted to a matrix 15 for computing the resistivity. This matrix may also be combined with the input module into a microprocessor in an alternative embodiment. The matrix computes the paired determination of layer "true" resistivity and thickness. This paired initial estimate calculation is similar to the process discussed above in FIG. 2, step C. The determined values of layer resistivity and thickness are transmitted to the output means 16.

The output means 16 shown in FIG. 4 may be a printer or other display for an observer to consider, but it may also be a digitized converter to supply the final iterated value of resistivity to another apparatus for further computation or display. The output means 16 may also be part of a digital processor or connected to another digital processor in alternative embodiments.

The invention method and apparatus allow accurate resistivity determinations of thin layers within formations of interest. Layers as thin as 46 cm (18 inches) can be manually or automatically analyzed on-site. This on-site analysis can determine if further logging is justified, without the need for an independent source of thickness data or uncertain determinations of "apparent" thickness from the induction log.

The invention is illustrated by the following example:

EXAMPLE

After inserting a Dual Induction Logging instrument into a well penetrating a thin layer of interest, two corrected resistivity data sets are obtained. Representative thick shoulder bed resistivity data can be obtained directly from the corrected deep data set proximate to the shoulder beds in the absence of other perturbation factors.

A chart, FIG. 3, of Deep Resistivity versus Medium Resistivity is entered to determine the resistivity of the thin layer. FIG. 3 comprises lines of constant "True Resistivity" and "Layer Thickness" plotted against maximum values of corrected deep and medium resistivity data. This chart is one of a series, with a separate chart required for a range of values of shoulder bed resistivity and dip angle. For example, assume that the following corrected resistivity data is obtained from a dual induction log proximate to a thin layer and adjacent thicker shoulder beds having a zero dip angle:

Average shoulder bed resistivity = 4 Ohm-meter ($R_s$)
Maximum deep layer resistivity = 6 Ohm-meter ($R_d$)
Maximum medium layer resistivity = 7 Ohm-meter ($R_m$)

FIG. 3 is entered with $R_d=6$ and $R_m=7$. An initial paired determination of "true" layer resistivity $R_t$ and a paired thin layer thickness h is made, in this example, $R_t=10$ Ohm-meters and h=2.5 feet.

The computed layer thickness can be used separately, or to compare to independent and/or apparent layer thickness data. Layer resistivity can be used directly to assess the commercial value of the thin layer. Resistivity can also be used to determine what further information (e.g., other tests or logging activities) is needed and/or determine the well completion activities.

Still other alternative embodiments are possible. These include: deleting the output of layer thickness if not required, and using this resistivity analysis method in conjunction with other layer logging devices and methods. Although the prior discussion is primarily directed at oil or gas exploration, the method is appropriate for geothermal, mineral or water exploration and production.

While the preferred embodiment of the invention has been shown and described, an example, and some alternative embodiments also shown and/or described, changes and modifications may be made thereto without departing from the invention. Accordingly, it is intended to embrace within the invention all such changes, modifications and alternative embodiments as fall within the spirit and scope of the appended claims.

What is claimed is:

1. A well logging method for determining the resistivity of a planar layer having a generally constant thickness and bounded on two sides by adjoining shoulder layers, the method using medium and deep layer associated electrical signals generated by a dual induction logging tool traversing along the axis of a cylindrically shaped well bore penetrating the planar layer at a dip angle from the cylindrical axis to the perpendicular of the planar layer, which method comprises the steps of:

(a) placing the logging tool in the well bore and traversing a portion of the well bore;

(b) obtaining a deep and a medium series of data representing the response to said electrical signals from the traversing tool, wherein the two data series associated with the shoulder layers form a shoulder layer input and the two data series associated with the planar layer form a planar layer input;

(c) computing a representative shoulder layer resistivity from the shoulder layer input;

(d) determining a representative value of planar layer resistivity from a calculation dependent upon the planar layer input, the computed shoulder layer resistivity, and the dip angle, wherein said calculation is independent of an input related to a measurement of the planar layer thickness; and (e) if fluid production or withdrawal potential is indicated by said measurement, moving fluid in said planar layer.

2. The method of claim 1 wherein each of the shoulder layers is thicker than the thickness of the planar layer.

3. The method of claim 2 wherein step (d) also determines a value of planar layer thickness from the calculation.

4. The method of claim 3 which also comprises steps of:

(f) comparing a measured value of planar layer thickness to the determined value of planar layer thickness; and (g) outputting a representative value of planar layer thickness based upon a calculation depending upon said comparison.

5. An apparatus for the determination of a representative electromagnetic property of a layer having a generally constant thickness dimension over a zonal depth of interest, said determination based upon at least two zonal depth related electromagnetic signals, which apparatus comprises:

at least one electromagnetic property sensing instrument locatable within a cavity penetrating the layer and capable of generating said signals;

an encoding module in communication with the instrument, the module capable of outputting encoded two or more zonal depth related signals;

a computational matrix in communication with the encoding module, the computational matrix capable of generating a layer of electromagnetic property value from a mathematical relationship depending upon the encoded zonal depth related signals and independent of an encoded layer thickness related signal;

means for outputting the generated value of layer electromagnetic property; and means for moving a fluid in said layer.

6. The apparatus of claim 5 wherein the cavity contains a fluid and the module is also capable of encoding properties of the fluid and the cavity, and wherein the computational matrix is also capable of correcting the encoded signals based upon calculations depending upon the fluid and the cavity properties, and the matrix is also capable of generating a computed value of the layer thickness.

7. A method for determining a first property of a generally planar layer from a plurality of property related input electromagnetic signals generated by an instrument proximate to said layer, each of said signals associated with an instrument sensitivity zone within said layer, which method comprises the steps of:

(a) locating said instrument generating said signals proximate to said layer;

(b) obtaining said signals from said located instrument;

(c) determining said first property from a calculation which depends upon at least two of said zone related input signals and said calculation is independent of a layer thickness related input signal; and (d) if fluid production or withdrawal potential is indicated by said determination, moving fluid in said planar layer.

8. The method of claim 7 wherein said layer is generally planar having a representative planar thickness, wherein said instrument is located within a cavity having an axis and penetrating said layer at a dip angle from said axis to the perpendicular of the planar layer, and wherein said determining step (c) is also dependent upon said dip angle and said determination step (c) also determines the representative thickness of said layer.

9. A method for determining an electromagnetic property of a generally planar middle layer having a representative thickness and bounded on two sides by adjoining shoulder layers, the property determining method using first and second electromagnetic property related input signals generated by an instrument, said first and second signals associated with a first and second sensitivity zone within said layer, which method comprises the steps of:

(a) traversing said instrument generating said signals proximate to said layers;

(b) obtaining said middle layer input signals during said traverse proximate to said middle layer and shoulder layer input signals during said traverse proximate to said shoulder layers;

(c) determining a representative shoulder layer electromagnetic property from calculations depending upon at least one of said shoulder layer input signals; and (d) computing a value of middle layer electromagnetic property, wherein said electromagnetic property value is calculated from a mathematical relationship depending upon said first and second middle layer input signals and said determined shoulder property, and wherein said calculation is not dependent upon an input signal related to said middle layer thickness; and (e) if fluid production or withdrawal potential is indicated by said computed value, moving fluid in said middle layer.

10. The method of claim 9 wherein said instrument traverses a generally straight line within a cavity intersecting said layers, and wherein said mathematical relationship of computing step (d) is also dependent upon a dip angle measured between said straight line and a perpendicular to said planar middle layer.

11. The method of claim 10 wherein said cavity contains a liquid and said method also comprises correcting said input signals by multiplying said signals by at least one correction factor calculated from an interrelationship dependent upon at least one property of said liquid.

12. The method of claim 11 wherein said representative shoulder layer resistivity is derived from the average value of one of said corrected shoulder layer input signals produced when said instrument is also distal from said sides.

13. The method of claim 12 wherein said corrected middle layer input signals are each determined from a maximum value of said corrected first and second middle layer input signals produced when said instrument is also distal from said sides.

14. The method of claim 13 wherein said computing step (d) also comprises computing a value of representative thickness of said middle layer thickness.

15. The method of claim 14 wherein said thickness computing comprises determining said thickness from a calculation dependent upon said determined average shoulder layer resistivity, said computed value of electromagnetic property, and said dip angle.

16. The method of claim 15 wherein said determining and computing steps are accomplished within a microprocessor located proximate to said cavity.

17. The method of claim 7 which also comprises the step of removing said instrument after determining said first property.

* * * * *